(12) United States Patent
Wadia et al.

(10) Patent No.: US 7,476,086 B2
(45) Date of Patent: Jan. 13, 2009

(54) TIP CAMBERED SWEPT BLADE

(75) Inventors: Aspi Rustom Wadia, Loveland, OH (US); Peter Nicholas Szucs, West Chester, OH (US); Max Robert Farson, West Chester, OH (US); Virginia Louise Wilson, Walton, KY (US); William Joseph Solomon, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 615 days.

(21) Appl. No.: 11/209,085

(22) Filed: Aug. 22, 2005

(65) Prior Publication Data

US 2007/0243068 A1    Oct. 18, 2007

Related U.S. Application Data

(63) Continuation-in-part of application No. 11/100,752, filed on Apr. 7, 2005, now Pat. No. 7,374,403.

(51) Int. Cl.
    *B64C 27/46*    (2006.01)
(52) U.S. Cl. ............... 416/223 R; 416/242; 416/DIG. 5
(58) Field of Classification Search ............ 415/1, 415/173.1, 192, 220, 222; 416/223 R, 223 A, 416/228, 242, 243, DIG. 5
See application file for complete search history.

(56) References Cited

U.S. PATENT DOCUMENTS

| | | | |
|---|---|---|---|
| 4,358,246 A | 11/1982 | Hanson et al. | |
| 4,971,520 A | 11/1990 | Van Houten | |
| 5,167,489 A | 12/1992 | Wadia et al. | |
| 5,169,288 A | 12/1992 | Gliebe et al. | |
| 5,273,400 A | 12/1993 | Amr | |
| 5,478,199 A | 12/1995 | Gliebe | |
| 5,584,660 A | 12/1996 | Carter et al. | |
| 5,642,985 A | 7/1997 | Spear et al. | |
| 5,735,673 A * | 4/1998 | Matheny et al. | ......... 416/223 A |
| 5,769,607 A | 6/1998 | Neely et al. | |
| 5,810,555 A | 9/1998 | Savage et al. | |
| 5,906,179 A | 5/1999 | Capdevila | |
| 6,048,174 A | 4/2000 | Samit et al. | |
| 6,059,532 A | 5/2000 | Chen et al. | |
| 6,071,077 A | 6/2000 | Rowlands | |
| 6,315,521 B1 | 11/2001 | Hunt | |
| 6,328,533 B1 | 12/2001 | Decker et al. | |
| 6,331,100 B1 * | 12/2001 | Liu et al. | ..................... 416/238 |
| 6,338,609 B1 | 1/2002 | Decker et al. | |
| 6,368,061 B1 | 4/2002 | Capdevila | |
| 6,386,830 B1 | 5/2002 | Slipper et al. | |
| 6,471,474 B1 * | 10/2002 | Mielke et al. | ............ 415/199.4 |

(Continued)

OTHER PUBLICATIONS www.rolls-royce.com, "Trent 1000," copyright 2004, 3 pages.

*Primary Examiner*—Igor Kershteyn
(74) *Attorney, Agent, or Firm*—William S. Andes; Francis L Conte

(57) ABSTRACT

A fan blade includes an airfoil having opposite pressure and suction sides extending in span between a root and tip, and extending in chord between opposite leading and trailing edges. From root toward tip, the airfoil includes increasing stagger and decreasing camber, and increasing chord length to barrel the airfoil along both the leading and trailing edges. The airfoil further includes forward aerodynamic sweep at the tip, and non-forward aerodynamic sweep between the maximum barrel and the root.

23 Claims, 5 Drawing Sheets

U.S. PATENT DOCUMENTS

| | | | |
|---|---|---|---|
| 6,524,070 B1 * | 2/2003 | Carter | 416/193 A |
| RE38,040 E | 3/2003 | Spear et al. | |
| 6,561,760 B2 | 5/2003 | Wadia et al. | |
| 6,561,761 B1 | 5/2003 | Decker et al. | |
| 6,562,227 B2 | 5/2003 | Lamphere et al. | |
| 6,991,428 B2 * | 1/2006 | Crane | 416/2 |

* cited by examiner

TIP CAMBERED SWEPT BLADE

This is a Continuation-in-part of U.S. patent application Ser. No. 11/100,752, filed Apr. 7, 2005, and incorporated herein by reference, now U.S. Pat. No. 7,374,403.

BACKGROUND OF THE INVENTION

The present invention relates generally to gas turbine engines, and, more specifically, to turbofan aircraft engines.

In a turbofan engine air is pressurized in a compressor and mixed with fuel in a combustor for generating hot combustion gases. A high pressure turbine (HPT) extracts energy from the combustion gases to power the compressor. A low pressure turbine (LPT) extracts additional energy from the combustion gases to power the fan disposed upstream from the compressor.

The primary design objective of aircraft turbofan engines is to maximize efficiency thereof for propelling an aircraft in flight, and correspondingly reduce fuel consumption. Accordingly, the various cold and hot section rotor and stator components which define the internal flow passages for the pressurized air and combustion gases, and which extract energy from those gases, are specifically designed for maximizing the efficiency thereof while correspondingly obtaining a long useful life.

The turbofan itself includes a row of large fan rotor blades extending radially outwardly from the perimeter of a supporting rotor disk. The fan is powered by the LPT for pressurizing the incident air for producing a majority of propulsion thrust discharged from the fan outlet. Some of the fan air is channeled into the compressor wherein it is pressurized and mixed with fuel for generating the hot combustion gases from which energy is extracted in the various turbine stages, and then discharged through a separate core engine outlet.

Turbofan engines are continually being developed and improved for maximizing their thrust capability with the greatest aerodynamic efficiency possible. Since the fan produces a substantial amount of thrust during operation, noise is also generated therefrom and should be reduced as much as possible consistent with the various competing design objectives.

For example, fan blades are typically designed for maximizing the aerodynamic loading thereof to correspondingly maximize the amount of propulsion thrust generated during operation. However, fan loading is limited by stall, flutter, or other instability parameters of the air being pressurized.

Accordingly, modern turbofan engines are designed with a suitable value of stability and stall margin over their operating cycle from takeoff to cruise to landing of the aircraft to ensure acceptable operation and performance of the engine without overloading the capability of the turbofan.

Furthermore, modern turbofan engines have relatively large diameter turbofans which rotate at sufficient rotary velocity to create supersonic velocity of the blade tips relative to the incident air stream. The blade tips are therefore subject to the generation of shock waves as the air is channeled and pressurized in the corresponding flow passages defined between adjacent fan blades.

Accordingly, each fan blade is specifically tailored and designed from its radially inner platform to its radially outer tip and along its circumferentially opposite pressure and suction sides which extend in chord axially between the opposite leading and trailing edges thereof. The pressure side of one airfoil defines with the suction side of an adjacent airfoil the corresponding flow passage from root to tip of the blades through which the air is channeled during operation.

Each airfoil is typically twisted with a corresponding angle of stagger from root to tip, with airfoil tips being aligned obliquely between the axial and circumferential directions of the fan.

During operation, the incoming ambient air flows at different relative velocities through the inter-blade flow passages from root to tip of the blades including subsonic airflow at the blade roots and radially outwardly thereof up to the supersonic velocity of the air at the blade tips in various portions of the operating range.

Fan stall margin is a fundamental design requirement for the turbofan and is affected by the aerodynamic fan loading, the fan solidity, and the fan blade aspect ratio. These are conventional parameters, with the fan loading being the rise in specific enthalpy across the fan blades divided by the square of the tip speed.

Blade solidity is the ratio of the blade chord, represented by its length, over the blade pitch, which is the circumferential spacing of the blades at a given radius or diameter from the axial centerline axis. In other words, blade pitch is the circumferential length at a given diameter divided by the number of blades in the full fan blade row. And, the fan blade aspect ratio is the radial height or span of the airfoil portion of the blade divided by its maximum chord.

Conventional experience or teachings in the art indicate that when inlet Mach numbers are sufficiently high that passage shock can separate the suction surface boundary layer of the air in the inter-blade flow passages, good efficiency requires that the solidity should be high to allow the flow to reattach.

Conventional design practice for turbofan efficiency and adequate fan stall margin typically require relatively high tip solidity which is generally equal to the fan tip relative Mach number at the design point, such as cruise operation. In other words, the tip Mach number is suitably greater than one (1.0) for supersonic flow, and the fan tip solidity is correspondingly greater than one and generally equal to the tip relative Mach number for good designs.

The design considerations disclosed above are merely some of the many competing design parameters in designing a modern turbofan primarily for good aerodynamic performance and efficiency, as well as for good mechanical strength for ensuring a long useful life thereof. Each fan blade twists from root to tip, and the opposite pressure and suction sides thereof also vary in configuration to specifically tailor the flow passages from root to tip for maximizing fan efficiency with suitable stall margin and mechanical strength.

The resulting turbofan design is a highly complex design with three dimensional variation of the pressure and suction sides of the individual airfoils across their axial chord and over their radial span. And, the individual fan blades cooperate with each other in the full row of blades to define the inter-blade flow passages and to effect the resulting aerodynamic performance and stall margin of the entire fan.

Accordingly, it is desired to further improve the efficiency of the modern turbofan while maintaining adequate stability and stall margin notwithstanding the various competing design objectives addressed in part above.

BRIEF DESCRIPTION OF THE INVENTION

A fan blade includes an airfoil having opposite pressure and suction sides extending in span between a root and tip, and extending in chord between opposite leading and trailing edges. From root toward tip, the airfoil includes increasing stagger and decreasing camber, and increasing chord length to barrel the airfoil along both the leading and trailing edges.

The airfoil further includes forward aerodynamic sweep at the tip, and non-forward aerodynamic sweep between the maximum barrel and the root.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
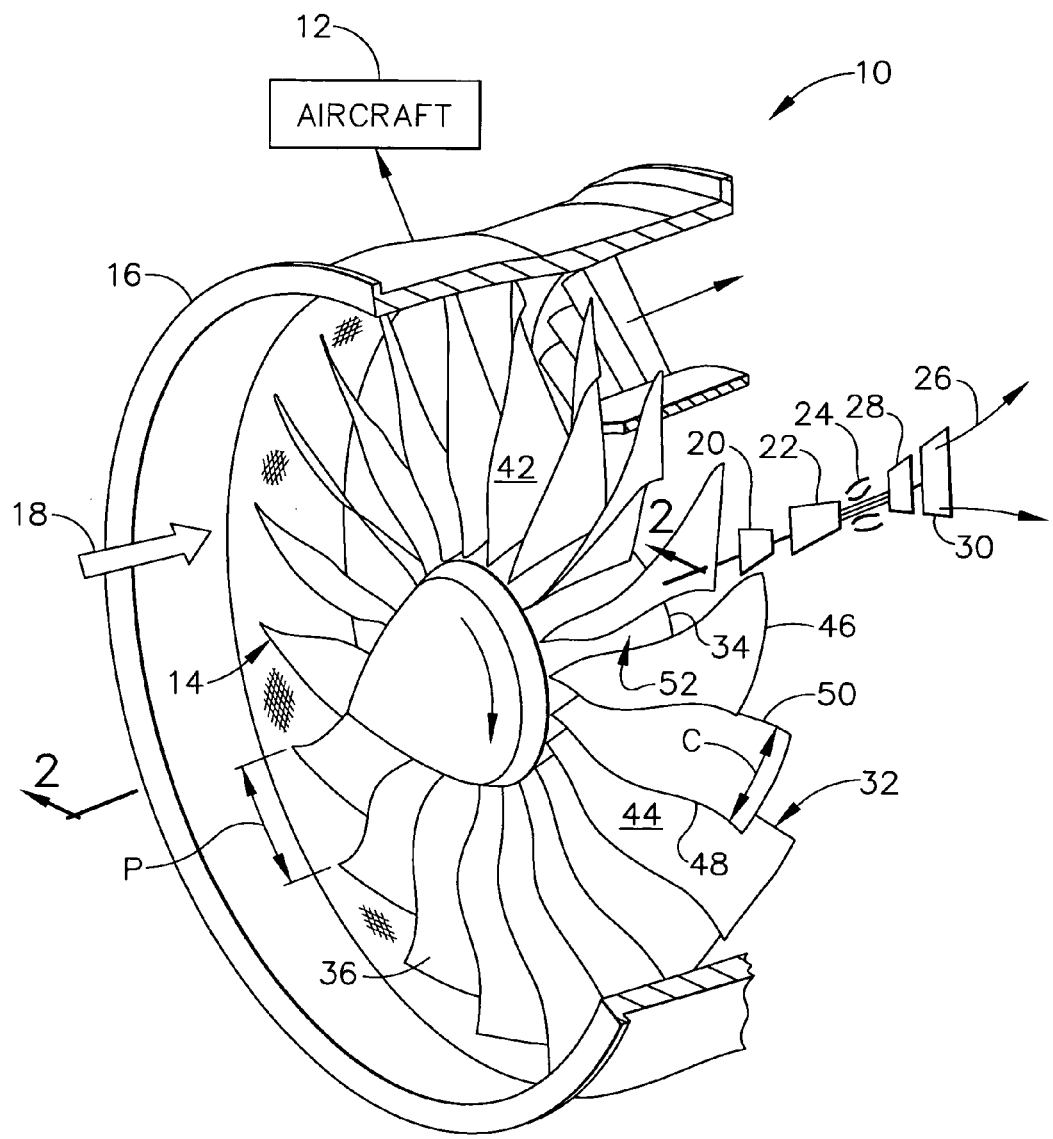
FIG. 1 is a partly schematic isometric view of a turbofan in an aircraft engine for powering an aircraft in flight.

Illustrated in FIG. 1 is a gas turbine engine 10 configured for powering an aircraft 12 in flight, and suitably mounted therein. The engine is axisymmetrical about a longitudinal or axial centerline axis and includes a fan or turbofan 14 suitably mounted coaxially inside a surrounding annular fan casing 16.

During operation, ambient air 18 enters the inlet end of the fan 14 and is pressurized thereby for producing propulsion thrust for propelling the aircraft in flight. A portion of the fan air is suitably channeled in turn through a low pressure or booster compressor 20 and a high pressure compressor 22 which further pressurize the air in turn.

The pressurized air is mixed with fuel in an annular combustor 24 for generating hot combustion gases 26 which are discharged in the downstream direction. A high pressure turbine (HPT) 28 first receives the hot gases from the combustor for extracting energy therefrom, and is followed in turn by a low pressure turbine (LPT) 30 which extracts additional energy from the combustion gases discharged from the HPT. The HPT is joined by one shaft or rotor to the high pressure compressor 22, and the LPT is joined by another shaft or rotor to both the booster compressor 20 and the fan 14 for powering thereof during operation.

The exemplary turbofan engine 10 illustrated in FIG. 1 may have any conventional configuration and operation for powering an aircraft in flight from takeoff to cruise to landing, but is modified as further described hereinbelow for increasing the aerodynamic efficiency of the fan 14 while maintaining suitable stability and stall margin thereof during the operating cycle.

Figure 2:
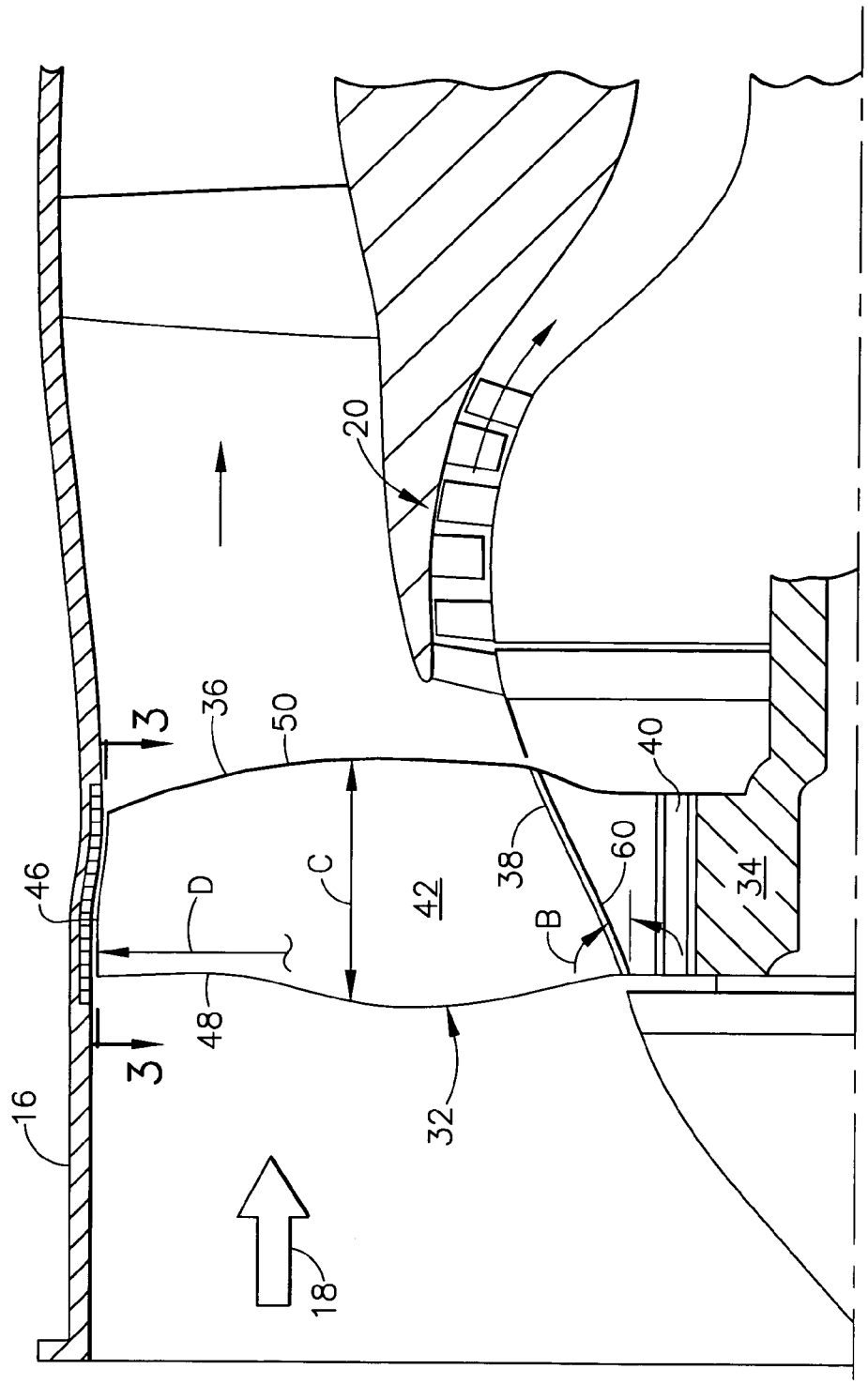
FIG. 2 is an axial sectional view through the turbofan portion of the engine illustrated in FIG. 1 and taken along line 2-2.

More specifically, FIGS. 1 and 2 illustrate an exemplary embodiment of the turbofan 14 which includes a row of fan rotor blades 32 extending radially outwardly in span from the perimeter rim of a supporting rotor disk 34. As shown in FIG. 2, each blade includes an airfoil 36 extending outwardly from a sloped root 38 defining the radially inner boundary of the fan air flowpath. Each blade also includes an integral dovetail 40 extending radially inwardly from the airfoil below the root for mounting each blade in a corresponding dovetail slot in the rim of the rotor disk.

The fan blades may be made from suitable high strength materials like titanium or carbon fiber composites. For example, the majority of the blade may be formed of carbon fiber composite reinforced with titanium shields along the leading and trailing edges, and along the tip.

As illustrated in FIGS. 1 and 2, each airfoil 36 has a suitable aerodynamic configuration including a generally concave pressure side 42 and a circumferentially opposite, generally convex suction side 44. The opposite sides of each airfoil extend radially in span from the inner root end thereof to the radially outer distal tip 46 disposed closely adjacent to the fan stator casing 16 for providing a relatively small tip clearance or gap therebetween.

Figure 3:
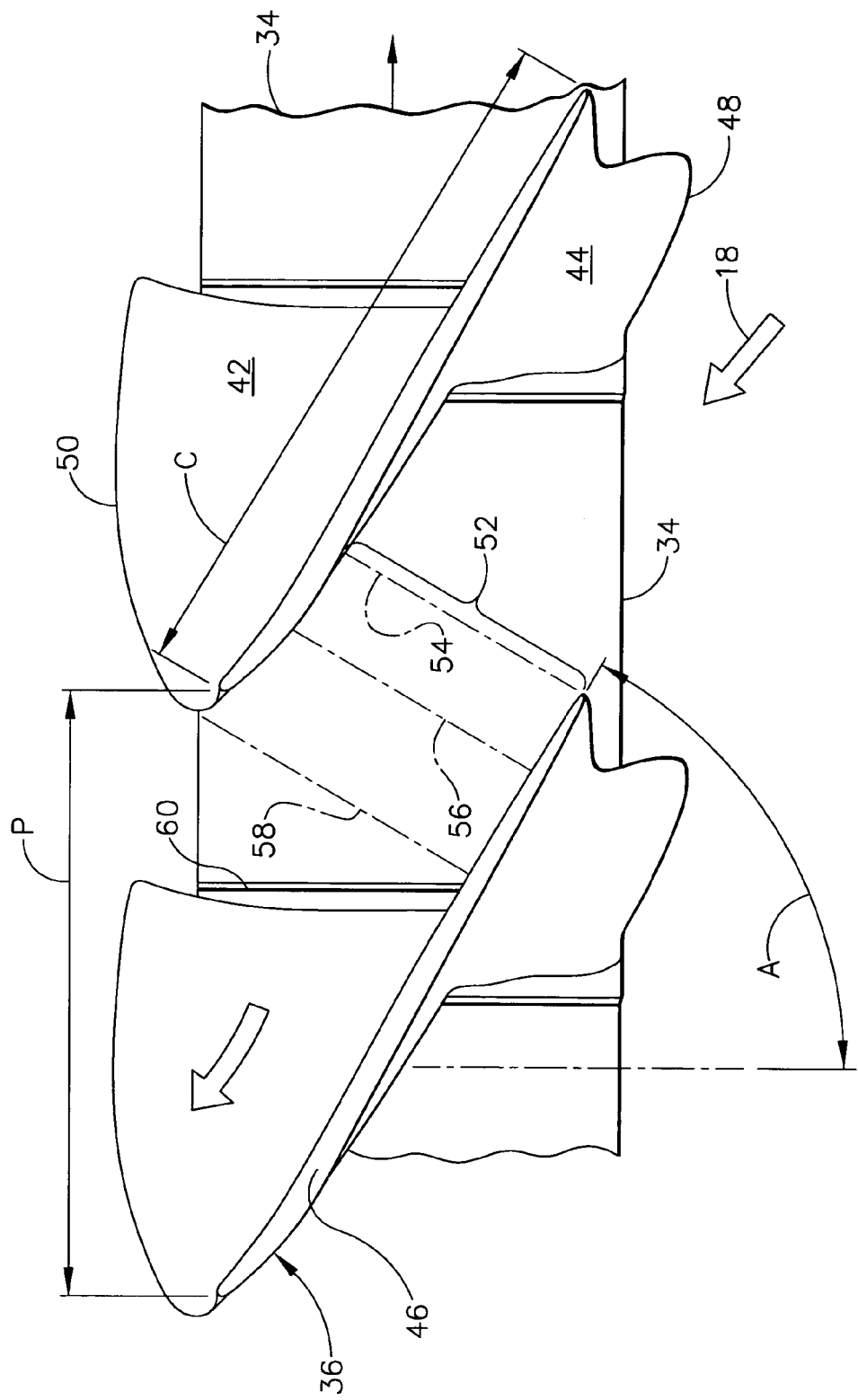
FIG. 3 is a top planiform view of two adjacent fan blades illustrated in FIG. 2 and taken generally along line 3-3.

As shown in FIGS. 2 and 3, each airfoil extends axially in chord C between opposite leading and trailing edges 48,50, with the chord varying in length over the span of the airfoil.

As shown in FIG. 3, adjacent airfoils 36 define circumferentially therebetween corresponding flow passages 52 for pressurizing the air 18 during operation. Each of the airfoils 36 includes stagger or twist represented by the stagger angle A from the axial or longitudinal axis, which stagger increases from the root to the tip of the airfoil.

For example, the stagger angle A at the blade tip may be substantial, and about 60 degrees, to position the leading edge 48 of one airfoil circumferentially adjacent but axially spaced from the suction side 44 of the next adjacent airfoil aft from the leading edge thereof to define a corresponding mouth 54 for the flow passage between the opposing pressure and suction sides of the adjacent airfoils. The contours and stagger of the adjacent airfoils over the radial span of the blades cause each flow passage to converge or decrease in flow area to a throat 56 of minimum flow area spaced aft from the mouth along most, if not all, of the radial span.

As further illustrated in FIG. 3, the relatively high airfoil stagger A also positions the trailing edge 50 of one airfoil 36 circumferentially adjacent to the pressure side 42 of the next adjacent airfoil while also being spaced axially therefrom in the tip region to define a corresponding discharge or outlet 58 for the corresponding flow passage between adjacent airfoils. In this way, the incoming air 18 is channeled in the corresponding flow passages 52 between adjacent airfoils as they rotate clockwise in FIGS. 1 and 3 for pressurizing the air to produce the propulsion thrust during operation.

As shown in FIGS. 2 and 3, a sloped platform 60 is disposed between corresponding pairs of adjacent airfoils 36 to conform with or match the sloped roots 38. Each platform 60 may be a discrete or separate component suitably mounted to the supporting fan disk between adjacent airfoils, or may be formed in halves integrally formed with the opposite sides of each fan blade along the roots thereof.

As shown in FIG. 2, the platform 60 slopes radially outwardly in the downstream or aft direction between the leading and trailing edges of the blade at a slope angle B of about 15-20 degrees, and defines the radially inner boundary of each flow passage 52 between the blades. The sloped platform cooperates with the airfoils themselves in pressurizing the airflow flowing downstream therepast.

The radially inner portion of the airfoils typically operates with subsonic airflow thereover for supercharging or initially pressurizing the inner portion of the air as it enters the booster compressor 20. The outer portion of the fan blade has the outer tip disposed at a suitably large outer diameter D and rotates at a corresponding rotational speed for effecting supersonic airflow therepast during certain portions of the operating envelope of the aircraft being powered by the engine.

Figure 4:
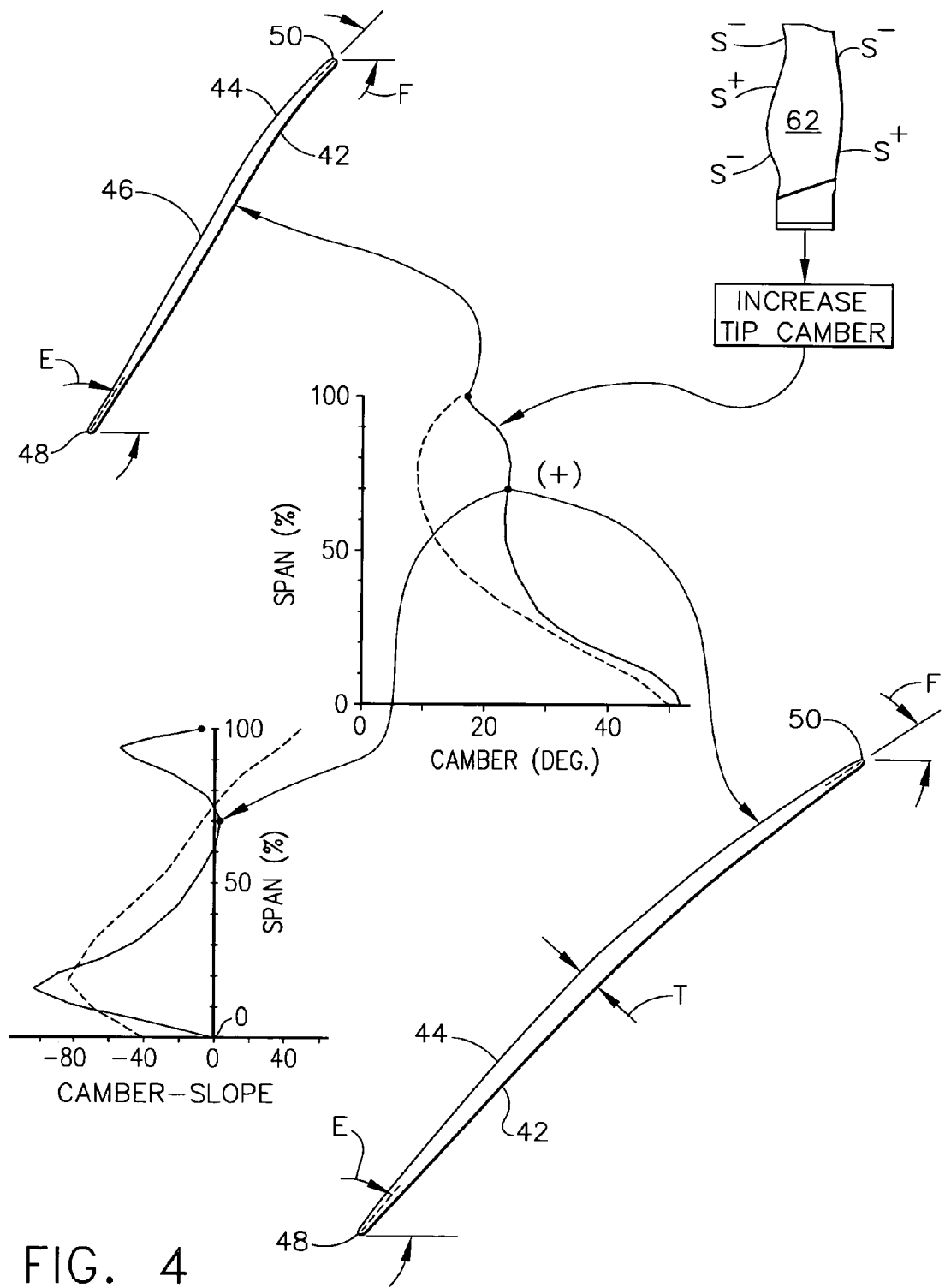
FIG. 4 illustrates two scaled graphs of airfoil camber and slope thereof versus span for the fan blade illustrated in FIG. 2 and a corresponding preexisting fan blade design, including exemplary radial or cylindrical sections thereof.

Another significant feature of the airfoil which affects its aerodynamic performance its camber which represents the amount of curvature of the airfoil along the radial or transverse sections between the leading and trailing edges thereof. FIG. 4 illustrates in solid line two graphs of exemplary camber and slope thereof over the span of the airfoil 36 from its root at zero percent span to its tip 46 at 100 percent span, along with two representative radial sections of the airfoil at 70 percent and 100 percent span.

The airfoil camber may be defined by the difference in local axial inlet angle E at the leading edge 48 and the local axial exit angle F at the trailing edge 50. The camber line of the airfoil is the mean line extending between the leading and trailing edge of each section between the opposite pressure and suction sides. At the leading edge, the camber line defines the inlet angle E relative to the axial or longitudinal axis of the engine, and at the trailing edge, the camber line defines the exit angle F also relative to the axial axis.

The camber for each radial section of the airfoil may be simply obtained by subtracting the exit angle F from the inlet angle E, with the resulting camber represented in degrees as shown in the camber graph from root to tip of the airfoil. The graph illustrates that the camber for the fan blade 32 decreases between the root and tip of the airfoil in a substantially smooth curve from root to just short of the tip, with a slight local increase or peak in camber in the outer span of the airfoil immediately below the tip.

As indicated above, the fan blade illustrated in FIG. 3 has substantial twist or stagger A of about 60 degrees for example from root to tip, along with a corresponding variation in camber of the individual radial sections from root to tip, and with a relatively large chord. The airfoil 36 of the fan blade is specifically configured to distinctly include sharp leading and trailing edges 48,50 from root to tip which gradually increase in airfoil thickness to a maximum thickness along the midchord region between the opposite leading and trailing edges.

For example, the sharp leading edge 48 of the airfoil may be defined by a circumscribed square outline in the exemplary range of 26 to 42 mils (0.66-1.0 mm) thickness, with the sharp trailing edge 50 being represented by an inscribed circle of diameter 28 to 40 mils (0.7-1.0 mm). The maximum thickness of the airfoil correspondingly ranges from about 120 to 260 mils (3-6.6 mm) from root to tip, which maximum thickness varies along the chord in the exemplary range of 40 percent to 60 percent from the leading edge in axial projection of the twisted airfoil along the longitudinal engine axis.

As shown in FIGS. 2 and 3, the stagger A and length of the chord C combine to effect the three-dimensional (3D) configuration of each airfoil. The section chords of the airfoil typically increase in length outboard from the root 38 to correspondingly barrel the airfoil above the root. The airfoil or chord barrelling may be observed in the axial side projection illustrated in FIG. 2 which locally enlarges the midspan region of the airfoil preferably along both the leading and trailing edges 48,50. The maximum airfoil barrel occurs at a suitable midspan region of the airfoil at an intermediate radial section of about 40 percent span from the root in the exemplary embodiment illustrated.

The leading edge barrelling extends in axial projection the leading edge upstream or forward of a straight line extending between the root and tip at the leading edge, and correspondingly the trailing edge barrelling extends in axial projection the trailing edge downstream or aft of a straight line extending between the root and tip at the trailing edge. In this way, the leading edge in the barrel extends axially forward of the airfoil root, and the trailing edge is correspondingly barrelled and also extends axially aft from the root.

The airfoil barrelling is yet another feature of the airfoil which affects the 3D configuration thereof and its aerodynamic performance in pressurizing the airflow channeled thereover during operation. In this regard, aerodynamic sweep is a conventional parameter represented by a local sweep angle which is a function of the direction of the incoming air and the orientation of the airfoil surface in both the axial and circumferential, or tangential, directions. The sweep angle is defined in detail in U.S. Pat. No. 5,167,489-Wadia et al., incorporated herein by reference.

Figure 5:
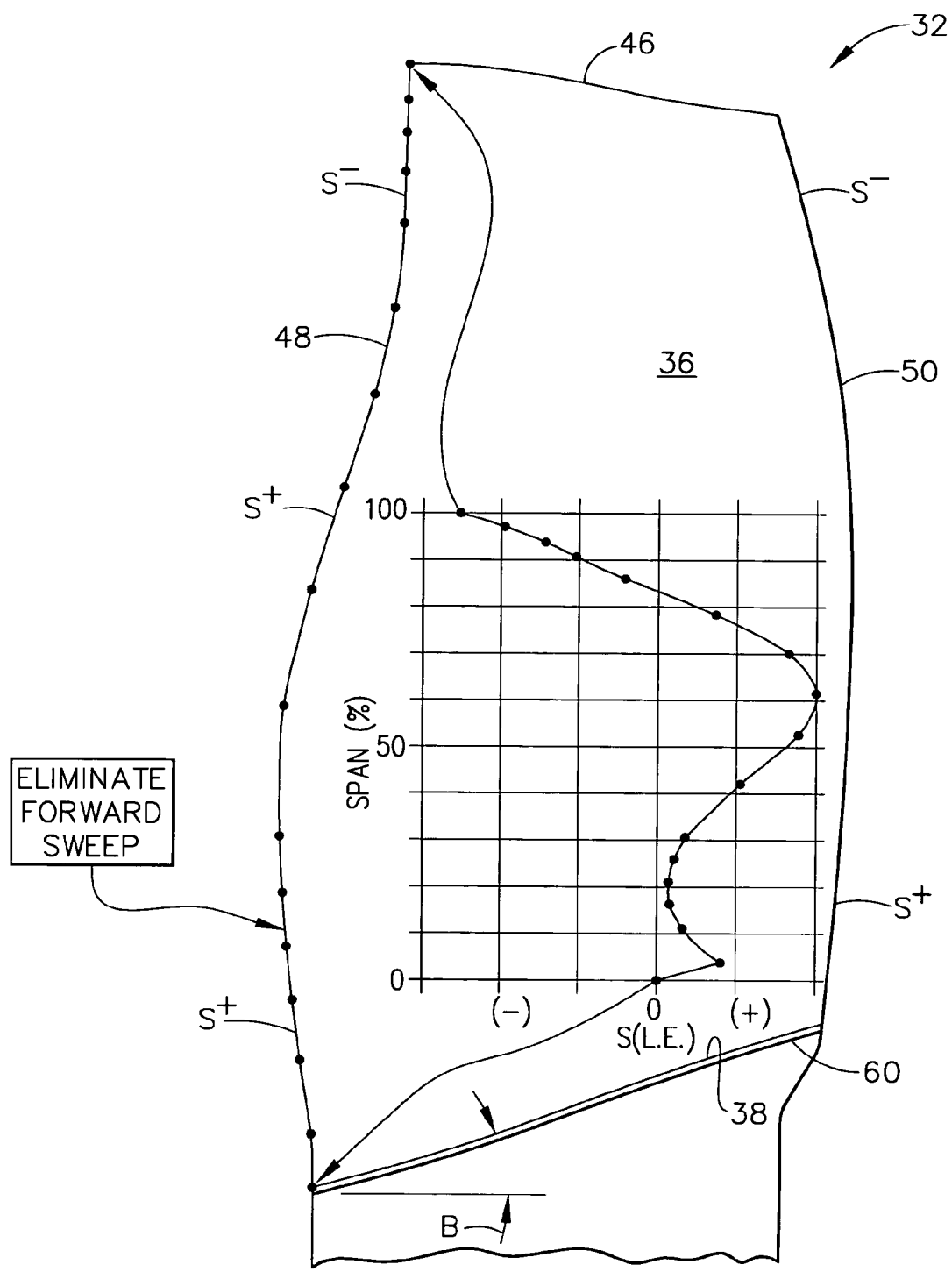
FIG. 5 is a side elevational view, like FIG. 2, of the fan blade and a graph of corresponding aerodynamic sweep thereof.

FIG. 5 illustrates the fan blade 32 along with the preferred aerodynamic sweep angle thereof as represented by the upper case letter S which has a negative value (−) for forward sweep, and a positive value (+) for aft sweep. A graph of aerodynamic sweep S for the leading edge 48 from root at zero percent span to tip at 100 percent span is superimposed over the airfoil.

The fan airfoil 36 preferably includes forward aerodynamic sweep $S^-$ at the airfoil tip 46 from leading edge 48 to trailing edge 50. Chord barrelling of the airfoil in conjunction with the forward tip sweep has significant aerodynamic benefits including increased flow capacity at high or maximum fan speed, while also improving part speed efficiency and stability margin.

However, the fan blade illustrated in FIG. 5 preferably includes non-forward aerodynamic sweep between the airfoil maximum barrel radial section and the sloped root 38 for further improving performance of the fan blade, particularly for part speed operability favoring cruise operation of the engine in propelling the aircraft in flight.

In the preferred embodiment illustrated in FIG. 5, the airfoil 36 includes relatively low aerodynamic sweep in the hub region near the root 38 or platform 60 which is less than about half the maximum sweep in the airfoil thereabove.

It is noted that the radial span of the airfoil is relatively large in the turbofan illustrated in FIGS. 1 and 2, with the inner portion or panel of the airfoil below the midspan operating with relatively low Mach velocity of the airflow as it is pressurized or supercharged prior to entry in the booster compressor 20. The radially outer portion or panel of each airfoil above the midspan is highly twisted and is operated in transonic to supersonic Mach velocity of the airflow for providing a substantial pressure increase in the fan air used for generating the substantial amount of propulsion thrust from the engine.

The relatively low level of aerodynamic sweep which is preferably aft sweep near the airfoil root is found in the low Mach number region of the blade and serves to moderate the twist and leading edge stress in the blade root for mechanical benefits and to improve the pressurizing capability for a given level of camber.

FIG. 5 illustrates that the initially forward sweep $S^-$ at the airfoil tip 46 transitions through zero sweep to aft aerodynamic sweep $S^+$ inwardly therefrom in the airfoil barrel both along the leading and trailing edges. In particular, the airfoil has maximum forward sweep along the leading edge at the tip 46 which transitions to maximum aft sweep inwardly therefrom along the leading edge in the barrel region of the airfoil. From the maximum aft sweep, the sweep decreases in aft magnitude along the leading edge towards the root 38 at zero span.

In the preferred embodiment illustrated in FIG. 5, the airfoil includes zero sweep along the leading edge 48 at the root 38, along with a local smaller peak in aft sweep along the leading edge between the root 38 and the maximum aft sweep. The maximum aft sweep along the leading edge occurs at about 60 percent span from the root, with the sweep remaining aft in magnitude over the entire inner panel span from 60 percent down to the root where it returns to zero sweep.

The leading edge sweep illustrated in FIG. 5 decreases rapidly from the maximum aft sweep near the midspan to the relatively low aft sweep in the inner panel down to the root which is substantially less than the magnitude of the maximum aft sweep. The local peak in leading edge sweep occurs at about five percent span and is less than half the magnitude of the maximum aft sweep, with the aft sweep being substantially lower in magnitude over most of the inner panel to about the 40 percent span elevation.

FIGS. 1-3 illustrate in general the typical configuration of a modern turbofan aircraft engine having a row of fan blades with corresponding stagger or twist from root to tip. As indicated in the Background section, there are many competing design parameters for the turbofan for balancing fan efficiency with stability and stall margin and with aero-mechanical parameters affecting flutter and noise and with mechanical strength of the fan blade subject both to centrifugal force during operation and aerodynamic loading.

FIGS. 4 and 5 illustrate schematically a method of improving aerodynamic efficiency of the turbofan engine 10 illustrated in FIG. 1 by derivation for example. Modern turbofan engines are typically derived from existing engines having proven experience in commercial service. Corresponding changes or modifications thereof may then be effected in accordance with conventional design practices, which, however, must be balanced in view of the various competing parameters such as efficiency and stall margin, for example. Further increasing efficiency and aerodynamic loading typically requires reduction in stall margin, and must therefore be balanced for overall performance.

FIG. 4 illustrates schematically a pre-existing or conventional design of a fan blade 62 for use in the type of turbofan engine illustrated in FIG. 1. The pre-existing fan has a full complement of twenty-two fan blades of suitably large outer diameter for effecting supersonic airflow at the tips during operation. An example of the preexisting fan blade 62 may be found in U.S. Pat. No. 6,328,533-Decker et al., incorporated herein by reference, and includes stagger, amber, sweep, and chord barrelling as described therein for enhanced efficiency and operation.

The pre-existing fan also has a corresponding solidity which is a conventional parameter equal to the ratio of the airfoil chord C, as represented by its length, divided by the circumferential pitch P or spacing from blade to blade at the corresponding span position or radius as shown in FIG. 3.

The circumferential pitch is equal to the circumferential length at the specific radial span divided by the total number of fan blades in the blade row. Accordingly, the solidity is directly proportional to the number of blades and chord length and inversely proportional to the diameter.

The fan blade 32 illustrated in FIGS. 4 and 5 may therefore be derived from the conventional fan blade 62 by initially scaling thereof for the intended size of the engine, reducing blade count as desired, and then increasing the airfoil camber in particular locally near the airfoil tip 46, and further eliminating forward sweep S⁻ along the leading edge locally near the airfoil root 38.

Shown in dashed line in the two graphs of FIG. 4 are the camber profile and slope thereof for the preexisting 22-count fan blade 62 which are preferably modified to locally increase (+) airfoil camber over the outer panel from about 50 percent span to the airfoil tip in an exemplary 18-count derived fan blade design as shown by the corresponding solid curves. In the lower section or panel of the airfoil below about 50 percent span down to and including the root in the improved airfoil 36 the specific camber profile is controlled by the blade count. If the blade count remains the same, the camber in the lower panel may decrease. If the blade count decreases, the camber in the lower panel may increase slightly as shown.

Correspondingly, forward aerodynamic sweep S⁻ is eliminated along the leading edge in the lower panel of the improved airfoil down to and including the root as additionally shown in FIG. 5.

FIG. 4 illustrates that the camber decreases in general from root to tip in both parent and derived fan blades, with a similar decrease in the inner panel and less decrease over the outer panel of the derived blade relative to the parent blade. The rate or slope of camber decrease is therefore correspondingly different, and significantly locally increases camber in the outer panel between the midspan and tip.

As indicated above with respect to FIG. 4, the airfoil camber is defined by the difference in the inlet and exit angles (E–F). The inlet angle E preferably increases smoothly over the span of the airfoil from root to tip, with the exit angle F of the airfoil increasing from root to tip at a greater rate with about twice the overall magnitude. The increase in exit angle from root to tip may be used to correspondingly decrease the camber from the root toward the tip, with the camber graph in FIG. 4 illustrating a local increase in camber in the outer panel immediately below the airfoil tip down to about the midspan within the barrel.

FIG. 4 further illustrates that the camber has a greater rate of decrease, or slope, in the inner panel radially outboard from the root into the barrel to about 50 percent span for example than in the outer panel outboard from within the barrel at the 50 percent span for example toward the radially outer tip, which correspondingly locally increases the camber near or just below the airfoil tip over most of the outer panel.

The slope graph of camber illustrated in FIG. 4 shows the pronounced difference in the derived fan blade 32 over the preexisting blade 62 for introducing the local increase or peak in camber in the outer panel just below the airfoil tip 46. The slope represents the change in camber over the radial span of the airfoil from root to tip.

The slope in both curves is initially negative from the root outward as the camber decreases in magnitude outwardly along the span. The decreasing slope is similar in the two curves in the lower panel of the airfoils, and is affected in large part by the specific blade count in the full complement of fan blades in the fan row.

However, from the midspan region outwardly above the barrel in the outer panel, the camber and slope thereof in the solid and dashed curves change significantly. In the dashed curves, the camber decreases outwardly over the inner panel, and then increases locally over the outer panel. The slope or rate of camber change has a negative peak at 20% span in the inner panel, and transitions to a positive peak at the airfoil tip after passing through the zero value at about 73% span. This corresponds with a local minimum peak in camber for the preexisting fan blade.

In contrast, the slope of the camber in the derived fan blade over the preexisting blade, although generally similar over the inner panel, is remarkably different over the outer panel so that the camber has a local increase or peak in magnitude at about 80% span between the tip 46 and barrel.

The camber as shown by the solid curve varies in slope with a local negative magnitude or peak in the slope immediately below the tip 46 at about 94% span, followed by a local positive magnitude or peak in the slope at about 70% span therebelow. The solid slope curve therefore crosses the zero line at two locations above the midspan at about 62% and 74% span. And, below the midspan, the solid slope curve has a maximum negative peak at about 15% span.

Accordingly, the camber and its slope in the derived fan blade 32 are specifically configured to effect the local increase in camber in the outer panel just below the tip, with the camber level returning to its minimum value at the airfoil tip 46. In this way, a significant improvement in fan performance and efficiency may be obtained, while reducing efficiency losses at the airfoil tip itself which has a camber level closely similar to conventional practice.

The fan blade with this special combination of aerodynamic sweep in its leading edge and locally increased camber in the outer panel is effective for increasing hub supercharging of the fan air while maintaining aeromechanical stability. The increased camber of the airfoil outer panel is further effective for delaying flutter and tailors the efficiency characteristics of the fan for improvement particularly at part speed corresponding with aircraft cruise operation.

Maintaining the aerodynamic sweep near the airfoil hub or root at a relatively low level in the aft direction may be used for minimizing the required twist in the airfoil which in turn will moderate or reduce the stresses in the blade root and dovetail, which is particularly beneficial for blades of composite metal and carbon fiber construction.

As a consequence of the moderate aft sweep in the airfoil hub region, the tendency for radial outflow of the air being pressurized will be reduced for providing more turning in the air from a given camber level. The increased camber in the outer panel of the airfoil will correspondingly reduce the incidence angle of the incoming air and correspondingly improve aeromechanical characteristics in the part speed region of the operating envelope.

The additional camber of the outer panel of the airfoil may reduce high speed performance of the fan, but can be balanced by the improved performance at part speed, specifically cruise operation of the engine for maximizing overall efficiency of the fan.

Aerodynamic efficiency may be further improved in the turbofan engine 10 illustrated in FIG. 1 by reducing the solidity at the airfoil tips by reducing the number of blades from twenty-two to either twenty or eighteen, for example, while maintaining substantially equal or constant the same ratio of the tip chord over the tip diameter C/D in the derived fan 14 as originally found in the pre-existing fan.

Furthermore, the reduction in number of fan blades increases the circumferential pitch P between the airfoils and increases the flow area of the flow passages 52, in particular at the throats 56 thereof, for reducing flow blockage during operation, and specifically at the airfoil tips subject to supersonic operation.

Accordingly, the derived turbofan 14 illustrated in FIGS. 1-3 includes no more than twenty of the fan blades 32 effected by reducing the tip solidity which has a relatively low magnitude at the tips 46 to position the leading edge 48 of each tip 46 circumferentially near the trailing edge 50 of the next adjacent tip 46, and correspondingly increase the width of the throat 56 normal or perpendicular between the opposing pressure and suction sides of adjacent airfoils.

The reduction in fan blade number while maintaining substantially constant the chord to diameter C/D ratio at the airfoil tips has significant advantages in the new turbofan including an increase in efficiency while maintaining adequate stability and stall margin, as well as reducing noise, as well as reducing weight and cost due to the fewer fan blades.

Quite significant in the low solidity turbofan design is the substantial reduction in flow blockage at the passage throats which more than offsets the decreased solidity effect on aerodynamic performance. Modern computational flow dynamics analysis predicts that lower solidity through reduced blade number is beneficial to cruise efficiency whereas lower solidity through reduction of the chord to diameter C/D ratio would be detrimental to cruise efficiency, which has been confirmed by testing.

The configuration of the flow passage 52 illustrated in FIG. 3 is particularly important to efficient operation of the fan, and in particular at the airfoil tips subject to supersonic flow. The specific profiles of the pressure and suction sides of the individual airfoils, the lateral thickness T of the airfoil, the root to tip stagger and camber of the airfoils and, of course, the reduced solidity due to the reduction in blade count while maintaining equal the chord to diameter C/D ratio are all used to define each flow passage 52.

In particular, the airfoil tips 36 are locally angled and vary in thickness T or width between the leading and trailing edges 48,50 to typically converge the flow passage 52 at the airfoil tips from the mouth 54 to the throat 56 and then diverge the flow passage also at the tip from the throat 56 to the outlet 58. Alternatively, the mouth and throat of the flow passages at the airfoil tips may be coincident in one plane at the leading edges, with the flow passages still diverging aft from the throats at the leading edges to the passage outlets at the trailing edges.

The convergence angle or slope between the mouth and the throat, and the divergence angle or slope between the throat and the outlet may be specifically designed for maximizing efficiency during supersonic operation of the blade tips in which aerodynamic shock is generated as the airflow is reduced in speed in the converging portion to choked flow of Mach 1 at the throat 56 followed in turn by subsonic diffusion in the diverging portion of the flow passage from or aft of the throat to the outlet.

The ratio of the flow area at the passage outlet 58 over the flow area at the throat 56 is a conventional measure of effective camber of the airfoils. The actual amount of airfoil camber near the tips thereof may be increased slightly over a conventional turbofan design as indicated above to allow the turbofan to tolerate the lower tip solidity during part-speed operation.

As indicated above, a modern turbofan is designed for an operating range from takeoff to cruise to landing, with cruise operation being predominant and for which maximum efficiency and operability is desired. However, part-speed performance must also be considered in good turbofan design and accommodated by the higher camber introduced near the blade tips for the low solidity turbofan design.

Accordingly, part-speed operability may be improved by increasing the camber of the airfoils 36 at the tips 46 thereof in conjunction with the reduction in solidity by reduction in blade count.

Since improved efficiency of the fan may be obtained through lowering solidity, the turbofan design may itself be otherwise conventional except as modified in accordance with the present disclosure. For example, the airfoils 36 illustrated in FIGS. 1-4 are relatively large in diameter for supersonic tip operation in a modern turbofan engine with a substantial pressure ratio of about 1.5. The corresponding bypass ratio of the fan air which bypasses the core engine is about 7.5 or greater. And, the airfoils may be provided with suitable aerodynamic sweep which is preferably forward or negative ($S^-$) at the tips 46 of the airfoils, with non-forward sweep near the hub or root.

Furthermore, the blade platforms 38 illustrated in FIG. 2 may be fluted for further improving aerodynamic performance of the turbofan. Fluted platforms or radially inner endwalls are disclosed in more detail in U.S. Pat. No. 6,561, 761, also incorporated herein by reference.

The incorporation by reference of these various patents listed above are merely exemplary of the various modern features which may be incorporated in the turbofan 14 for fully maximizing efficiency thereof. These and other conventional features may be used in the turbofan for conventional advantage, in addition to the improved modification of the turbofan by increasing tip camber and eliminating forward root sweep.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A gas turbine engine fan blade comprising:
   an airfoil extending outwardly from a sloped root and including opposite pressure and suction sides extending longitudinally in span from said root to an opposite tip, and extending axially in chord between opposite leading and trailing edges;
   said airfoil further including stagger increasing between said root and tip, camber decreasing therebetween, and chord length increasing outboard from said root to barrel said airfoil along both said leading and trailing edges; and
   said airfoil includes maximum forward aerodynamic sweep at said tip transitioning to maximum aft sweep inwardly along said leading edge in said barrel, and decreasing in aft magnitude to non-forward sweep at said root.

2. A blade according to claim 1 wherein said camber has a greater rate of decrease outboard from said root into said barrel than outboard from said barrel toward said tip for locally increasing said camber near said tip.

3. A blade according to claim 2 wherein said airfoil further includes sharp leading and trailing edges from said root to tip and gradually increases to a maximum thickness along the midchord region therebetween.

4. A blade according to claim 3 wherein said airfoil further includes low sweep near said root being less than about half the maximum aft sweep in said airfoil thereabove.

5. A blade according to claim 4 wherein said maximum forward sweep at said airfoil tip transitions to aft sweep inwardly therefrom in said airfoil barrel.

6. A blade according to claim 5 wherein said airfoil includes zero sweep along said leading edge at said root.

7. A blade according to claim 6 wherein said airfoil includes a local peak in aft sweep along said leading edge between said root and said maximum aft sweep.

8. A blade according to claim 5 wherein said airfoil camber is defined by the difference in axial inlet angle at said leading edge and axial exit angle at said trailing edge, and said exit angle increases from root to tip to correspondingly decrease said camber from said root toward said tip.

9. A plurality of said fan blades according to claim 8 arranged circumferentially in a row to define corresponding flow passages between adjacent airfoils for pressurizing air;
   each of said airfoils including stagger increasing between said root and said tip to position the leading edge of one airfoil circumferentially adjacent to the suction side of the next adjacent airfoil to define a mouth for said flow passage therebetween, with said flow passage converging to a throat aft from said mouth;
   adjacent airfoils including a sloped platform conforming to said sloped root for effecting with said airfoils said non-forward sweep near said platform; and
   wherein said camber has a local increase between said tip and barrel.

10. A fan blade row according to claim 9 wherein:
    said airfoil stagger positions the trailing edge of one airfoil circumferentially adjacent to the pressure side of the next adjacent airfoil to define an outlet for said flow passage therebetween; and
    said airfoil tips vary in thickness between said leading and trailing edges to diverge said flow passage therebetween.

11. A gas turbine engine fan blade comprising:
    an airfoil extending outwardly from a sloped root and including opposite pressure and suction sides extending longitudinally in span from said root to an opposite tip, and extending axially in chord between opposite leading and trailing edges;
    said airfoil further including stagger increasing between said root and tip, camber decreasing therebetween, and chord length increasing outboard from said root to barrel said airfoil along both said leading and trailing edges; and
    said airfoil includes forward aerodynamic sweep at said tip, and non-forward aerodynamic sweep between a maximum barrel in said airfoil and said sloped root.

12. A blade according to claim 11 wherein said airfoil further includes sharp leading and trailing edges from said root to tip and gradually increases to a maximum thickness along the midchord region therebetween.

13. A blade according to claim 11 wherein said airfoil further includes low sweep near said root being less than about half the maximum sweep in said airfoil thereabove.

14. A blade according to claim 11 wherein said forward sweep at said airfoil tip transitions to aft sweep inwardly therefrom in said airfoil barrel.

15. A blade according to claim 14 wherein said airfoil further includes maximum forward sweep at said tip transitioning to maximum aft sweep inwardly along said leading edge in said barrel, and decreasing in aft magnitude toward said root.

16. A blade according to claim 11 wherein said airfoil camber is defined by the difference in axial inlet angle at said leading edge and axial exit angle at said trailing edge, and said exit angle increases from root to tip to correspondingly decrease said camber from said root toward said tip.

17. A blade according to claim 16 wherein said camber has a greater rate of decrease outboard from said root into said barrel than outboard from said barrel toward said tip for locally increasing said camber near said tip.

18. A blade according to claim 16 wherein said camber varies in slope with a local negative peak immediately below said tip followed by a local positive peak therebelow.

19. A blade according to claim 16 wherein said camber has a local increase between said tip and barrel.

20. A plurality of said fan blades according to claim 11 arranged circumferentially in a row to define corresponding flow passages between adjacent airfoils for pressurizing air;
    each of said airfoils including stagger increasing between said root and said tip to position the leading edge of one airfoil circumferentially adjacent to the suction side of the next adjacent airfoil to define a mouth for said flow passage therebetween, with said flow passage converging to a throat aft from said mouth; and adjacent airfoils including a sloped platform conforming to said sloped root for effecting with said airfoils said non-forward sweep near said platform.

21. A fan blade row according to claim 20 wherein:

said airfoil stagger positions the trailing edge of one airfoil circumferentially adjacent to the pressure side of the next adjacent airfoil to define an outlet for said flow passage therebetween; and said airfoil tips vary in thickness between said leading and trailing edges to diverge said flow passage therebetween.

22. A fan blade row according to claim 21 comprising no more than twenty of said fan blades having a solidity defined by the ratio of said airfoil chord over the circumferential pitch and being low in magnitude at said tips to position the leading edge of each tip circumferentially near the trailing edge of the next adjacent tip and correspondingly increase the width of said throat.

23. A method of improving aerodynamic efficiency of said fan blade according to claim 11 comprising:

deriving said blade from a preexisting fan blade;

increasing said airfoil camber locally near said airfoil tip; and eliminating forward sweep along said leading edge near said airfoil root.

* * * * *